United States Patent
Haney

(10) Patent No.: US 6,663,298 B2
(45) Date of Patent: Dec. 16, 2003

(54) HAND HELD COUNTER BALANCE AND SHOCK ABSORBER CAMERA MOUNT

(76) Inventor: Todd Gregory Haney, 5316 Residencia, Newport Beach, CA (US) 92660

( * ) Notice: Subject to any disclaimer, the term of this patent is extended or adjusted under 35 U.S.C. 154(b) by 0 days.

(21) Appl. No.: 10/067,267

(22) Filed: Feb. 7, 2002

(65) Prior Publication Data

US 2003/0147641 A1 Aug. 7, 2003

(51) Int. Cl.[7] .............................................. G03B 17/00
(52) U.S. Cl. ...................................................... 396/419
(58) Field of Search .......................... 396/55, 419, 420, 396/421, 428; 248/638, 162.1

(56) References Cited

U.S. PATENT DOCUMENTS

| | | | | |
|---|---|---|---|---|
| 4,621,785 A | | 11/1986 | Embra | 396/419 |
| 4,621,786 A | * | 11/1986 | Greenlee | 396/419 |
| 4,697,773 A | * | 10/1987 | Jaumann et al. | 248/162.1 |
| 4,991,758 A | * | 2/1991 | Eaneff | 396/420 |
| 5,243,370 A | * | 9/1993 | Slater | 396/421 |
| 5,421,549 A | | 6/1995 | Richards | 248/163.2 |
| 5,458,306 A | | 10/1995 | O'Farrill et al. | 248/188.8 |
| 5,516,070 A | * | 5/1996 | Chapman | 396/428 |
| 5,742,859 A | | 4/1998 | Acker | 396/419 |
| 5,786,854 A | * | 7/1998 | Slade et al. | 396/419 |
| 6,188,849 B1 | * | 2/2001 | Staicouras | 396/421 |
| 6,263,160 B1 | | 7/2001 | Lewis | 396/13 |
| 6,301,447 B1 | * | 10/2001 | Jackson et al. | 396/428 |
| 6,554,500 B2 | * | 4/2003 | Melitopoulos | 396/428 |

* cited by examiner

*Primary Examiner*—Christopher Mahoney
(74) *Attorney, Agent, or Firm*—Siemens Patent Services, LC

(57) ABSTRACT

A video camera support device with an improved device for stabilizing recorded images by eliminating camera movement. The camera support device comprises a hand held monopod having motion-absorbing elements. The motion absorbing elements provide counter balance and shock absorbing means incorporated within the handle. The support device further provides a panning aiming arm with a remote control affixed thereto for remote operation of the camera.

20 Claims, 5 Drawing Sheets

HAND HELD COUNTER BALANCE AND SHOCK ABSORBER CAMERA MOUNT

BACKGROUND OF THE INVENTION

1. Field of the Invention

The present invention generally relates to a single-pole stand, known in the art as unipods or as monopods, used to support optical equipment. More particularly, the present invention relates to a stand, as such, adapted to receive and support a video camera and further having motion absorbing elements to stabilize the camera to eliminate jumping and jiggle of the recorded picture.

2. Background Discussion

Professional and amateur photographers, alike, have been plagued with the problem of maintaining stability of the camera while taking photographs. Advancements in technology have ushered forth sophisticated video cameras, auto-focussing and auto-control cameras, and the like. With such technological advances, cameras and camera equipment has become increasingly sophisticated.

The video camera operator, in particular, faces challenges pertaining to the recording of real-time images. Herein, unintentional movements during filming ranging from muscle twitches to breathing result in low quality images. Unsteadiness in a recorded picture is a problem that has been addressed in the prior art in various ways.

The patent to Embra (U.S. Pat. No. 4,621,785) discloses a mount for use with cameras in locations with excessive vibrations such as helicopters. Embra solves this problem by providing a vibration-damping mount having resilient means between the support tube and frame, as well as a piston arrangement, to thereby inhibit downward movements, thus absorbing vertical vibration. The patent to Richards (U.S. Pat. No. 5,421,549) discloses a vertically adjustable floor support stand, having adjustable tripod legs, for attachment to a conventional camera uni-pod. Richards aims to address compactibility and convenience by having easily foldable legs which are automatically extendable to operative spread configurations. Richards does not address the problem of isolating the camera from external movements.

Acker, (U.S. Pat. No. 5,742,859) provides a camera support and stabilizing device for isolating operator movements from the camera. A pivoting joint is employed between a handle and the camera to allow free tilting of the camera without free rotation of the camera. Further balancing means are included with the provision of struts that allow for improved roll stability. Acker primarly addresses rotational and lateral movements which may be compensated for amateur photographers by floating the center of gravity of the assembly atop a pivot point. However, counterbalance issues are not addressed with Acker, as it lacks the teaching of vertical weight distribution as with the present invention.

O'Farrill, et al. (U.S. Pat. No. 5,458,306) discloses a support foot for a monopod for still and video camera use. This patent provides a flat base which attaches to the lower end of a monopod forming a foot, providing for a still or video camera mounted on the upper end of the pod. The support foot is pivotally attached and offers a flat platform extending toward the photographer. However, the focus of this patented invention is the primary use of the foot, as O'Farrill discloses that the placement of the user's foot on to the surface of the support foot is enough to provide substantial stabilization. This patent teaches away from using hands to hold the camera steady.

The patent to Lewis (U.S. Pat. No. 6,263,160) discloses a permanently affixed platform for isolating a camera from angular motions of a supporting structure, such as a building or vehicle. Angular adjustment arms are employed to steer the device such that angular movements are progressively accommodated for. Lewis provides a complicated system, replete with circuitry for isolating angular motions of the supporting structure.

SUMMARY OF THE INVENTION

Accordingly, it is therefore an object of the present invention to provide an improved device for stabilizing recorded images by eliminating camera movement and overcoming the shortcomings presented in the prior art. While the above devices fulfill their respective, particular objective and requirements, the aforementioned patents do not describe a mono pod device capable of absorbing shock and providing counter balance, and further having an aiming arm with a remote control. In view of the foregoing disadvantages inherent in the known types of devices for stable mounting of optical equipment now present in the prior art, the present invention provides an improved device for mounting such equipment in a less complicated manner.

As such, the general purpose of the present invention, which will be described subsequently in great detail, is to provide a new and improved device for mounting camera equipment which has all of the advantages of the prior art and none of the disadvantages. Therefore, it can be appreciated that there exists a continuing need for an improved device which can be used to reduce jumping and jiggle in a recorded picture via a hand held unipod. In this regard, the present invention substantially fulfills this need as described below.

It is therefore an object of the present invention to provide a less complicated monopod camera support device.

It is also on object of the present invention to provide a monopod which is hand-held and has remote control with a panning handle.

A further object of the invention is to provide a monopod camera support with a handle that is spring-loaded to absorb unintentional movements made by the operator.

It is an object of the present invention to provide a monopod camera support with a counterbalance assembly that accommodates for inclines or uneven surfaces and stays level during recording.

Thus, the more important features of the invention have been outlined, rather broadly, in order that the detailed description thereof that follows may be better understood, and in order that the present contribution to the art may be better appreciated. There are, of course, additional features of the invention that will be described hereinafter and which will form the subject matter of the claims appended hereto.

BRIEF DESCRIPTION OF DRAWINGS

Features of the present invention which are believed to be novel are set forth with particularity in the appended claims. The invention, together with further objects and advantages thereof, may best be understood by reference to the following detailed description taken in conjunction with the accompanying sheets of drawings, in the figures of which like reference numerals identify like elements, and which:

As such, those skilled in the art will appreciate that the conception, upon which this disclosure is based, may readily be outlined as a basis for the designing of other structures, methods, and systems for carrying out the several purposes of this invention. It is important, therefore, that the claims be regarded as including such equivalent constructions insofar as they do not depart from the spirit and scope of the present invention.

DETAILED DESCRIPTION OF THE PREFERRED EMBODIMENT

Figure 1:
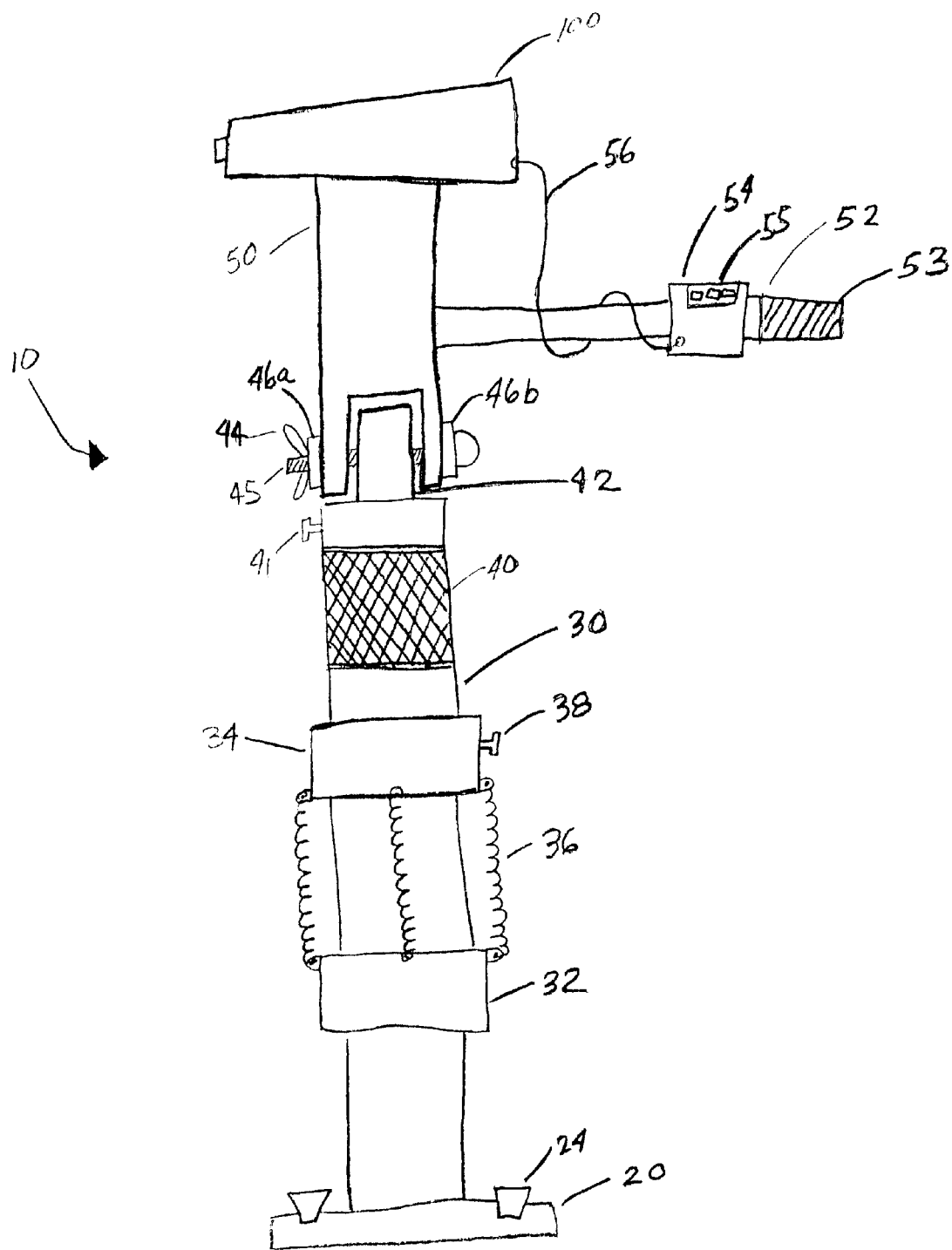
FIG. 1 is a side elevational view of the monopod camera mounting device.

FIG. 1 illustrates a preferred embodiment of the present invention. Herein is disclosed a monopod camera mounting device, generally indicated by 10.

Figure 2:
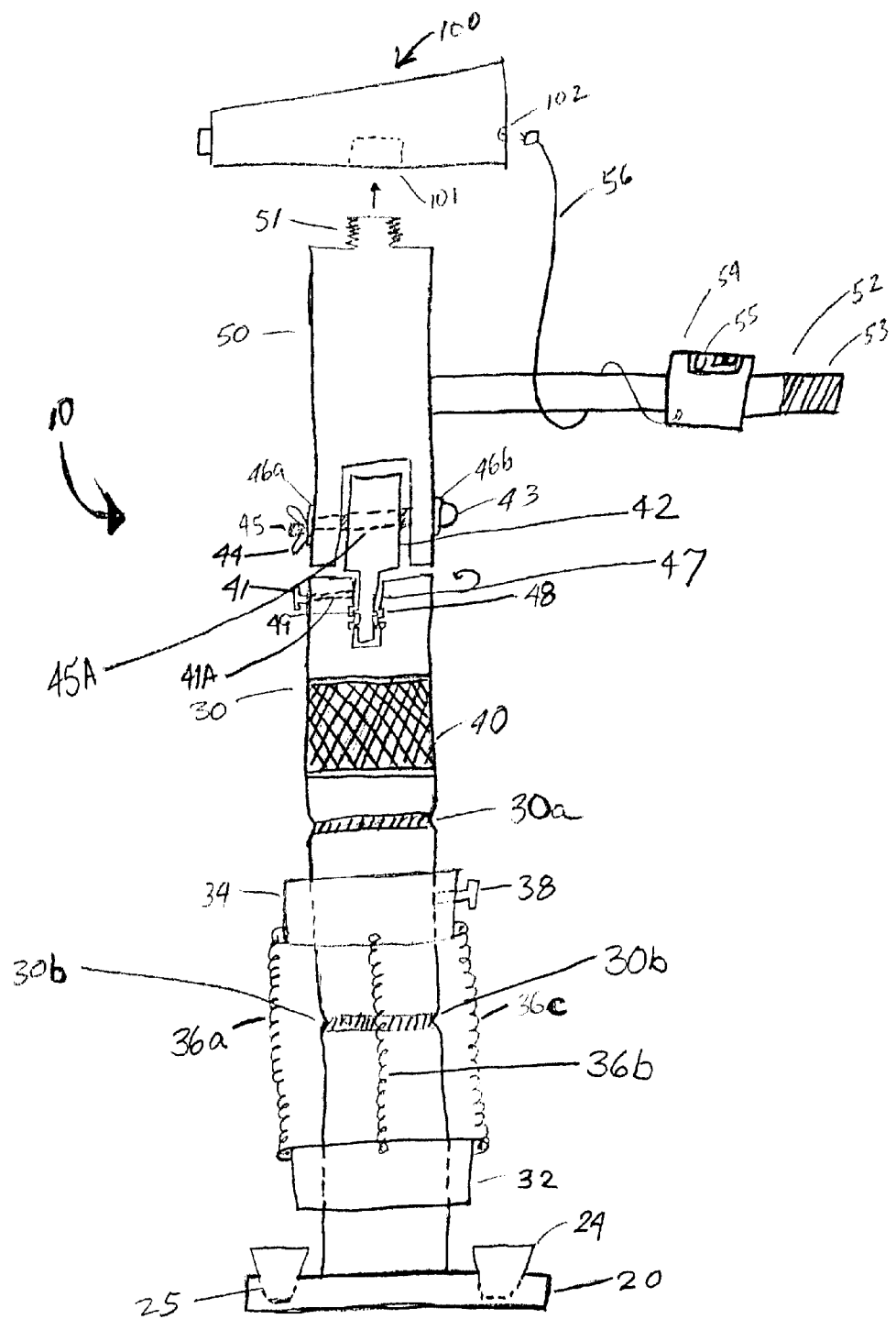
FIG. 2 is a partially exploded and out away side elevational view of the present invention.

As shown in FIG. 2, camera 100 is attached to the monopod 10 via a threaded mounting stud 51. The threaded mounting stud 51 is located on a proximal end of a camera mounting leg 50. The camera mounting leg 50 has both a proximal end and a distal end, and provides connection to the top end of supporting pod leg 30 (described below). The threaded mounting stud 51 mates with internal threads of a camera mounting slot 101 provided on a camera 100. Mounting in this threading manner may provide additional height of plus and/or minus a few inches as the camera 100 threads up and down the stud 51. However, one of ordinary skill in the art would recognize that other means of mounting the camera or optical equipment may be employed.

The monopod 10 is designed to extend and contract in length as well as provide rotational and angular movement. A series of telescoping junctions 30A and 30B, where sections of the supporting pod leg 30 meet, provide the height variations for the device. These junctions also facilitate compactibility and ease of transporting. As two telescoping junctions are disclosed, it is evident that more or fewer sections may be used without departing form the scope of the invention. The camera mounting leg 50 has a distal end which provides mobile coupling to facilitate angular and rotational movement (described below).

The monopod 10 is equipped with a panning handle 52, extending from the camera mounting leg 50, which allows 360 degree rotation in the left and right longitudinal plane. The handle 52 has handgrip 53 for aiding in accurate panning movement. Panning handle 52 may extend from the mounting leg 50, as illustrated, or it may be adapted to be slidably attached along the vertical axis of the monopod 10 by way of a spring loaded clamp. The means of attachment to the monopod 10 may vary in kind and location without departing form the scope of the invention.

A remote controller 54 may be affixed to the handle 52, near the handgrip 53, for remote operation of the camera device 100 via operation panel 55. The remote controller 54 may be affixed permanently or removably, eg., by a hook-and-loop (Velcro®) type strap mounting. The remote control 54 has a control panel 55 and is electronically connected to the camera 100 via cord 56 at the control port 102.

The distal end of camera mounting leg 50 is connected to a swivel leg 42 which provides the panning action of the handle 52. A bolt assembly comprised of threaded bolt 45, bolt cap 43, wing nut 44 and washers 46A and 46B provide the connection to the swivel leg 42. Swivel leg 42 has an upper end having a shaft 45A provided therein to receive a threaded bolt 45. Supporting pod leg 30 has a swivel shaft 47 formed in its upper end. This shaft 47 facilitates coupling to the mounting leg 50 via swivel leg 42. The lower end of the swivel leg 42 is smaller in diameter to allow for key-and-notch snug fitting within the swivel shaft 47. Located at the lower end of the swivel leg 42 are key notches 49 formed thereon. These notches 49 are mated to a keyhole channel 48, to thereby provide swivel motion. The panning motion of the mounting leg 50 can be ceased at any time during recording by actuating set screw 41. Set screw 41 is threadingly received within screw shaft 41A formed in the swivel leg 42. The set crew 41 is adjusted within the shaft 41A to allow friction contact with the swivel leg 42 to thereby cease movement of the leg 42.

To achieve angular movement for tilt motion of the camera 100, the distal end of the camera mount 50 is configured to threadably receive bolt 45, which in conjunction threads through swivel leg 42. The bolt 45 may be tightened or loosened, via adjustments to the wing nut 44 to subsequently allow for free range angular motion or a more restricted movement. The nut 44 may also be tightened to fix the camera at a desired angle during recording.

Figure 6:
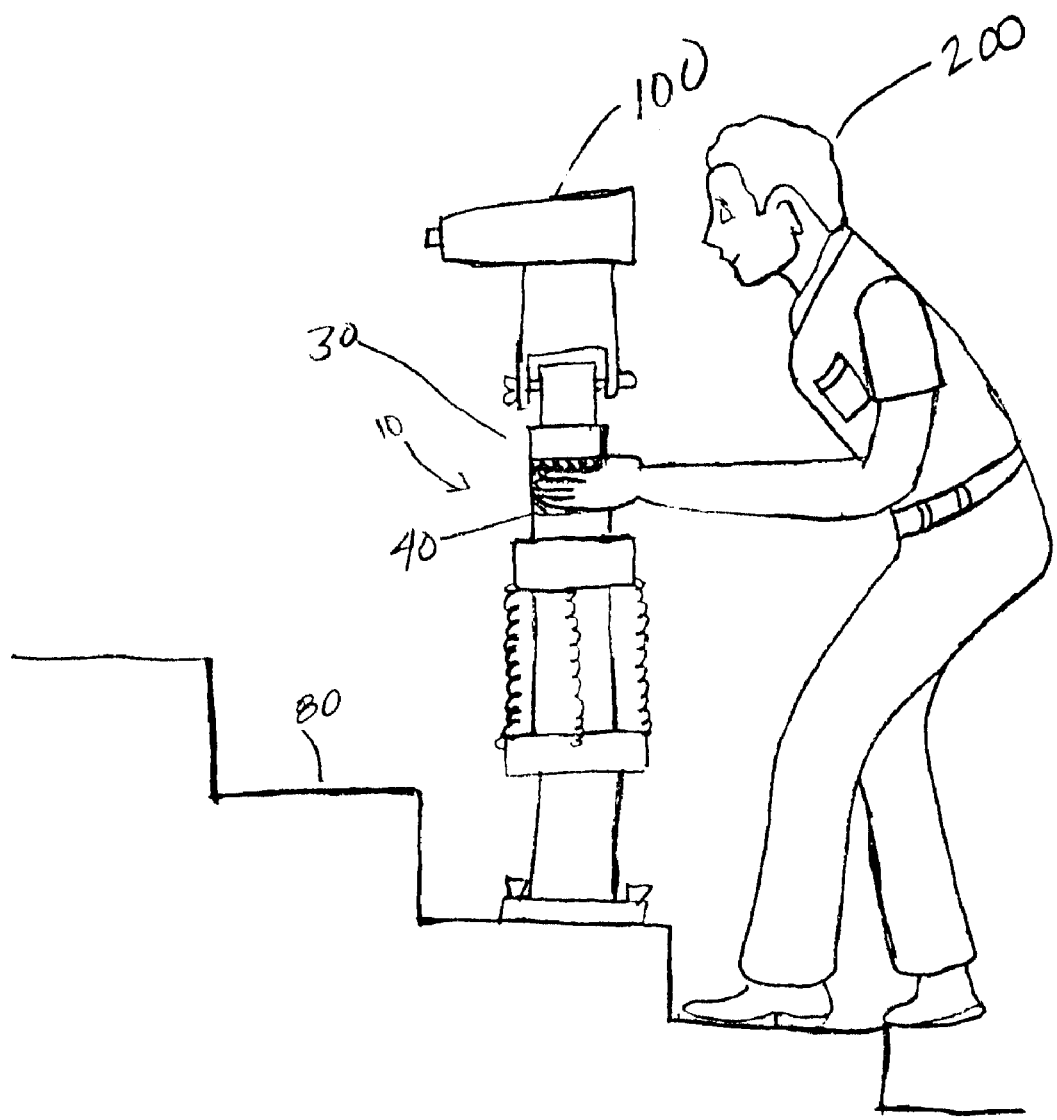
FIG. 6 shows the present invention in use.

The pod leg 30 has gripping section 40 for clasping by an operator 200 (as shown in FIG. 6) during image recording. One of the novel features of this invention is the apparent 'floating camera' affect provided by a combination of counter balancing of the mounted weight(s) and shock absorption of motion. These functions in combination with full range panning motion and free range angular movement produce an ultimate floating camera recording effect.

Figure 3:
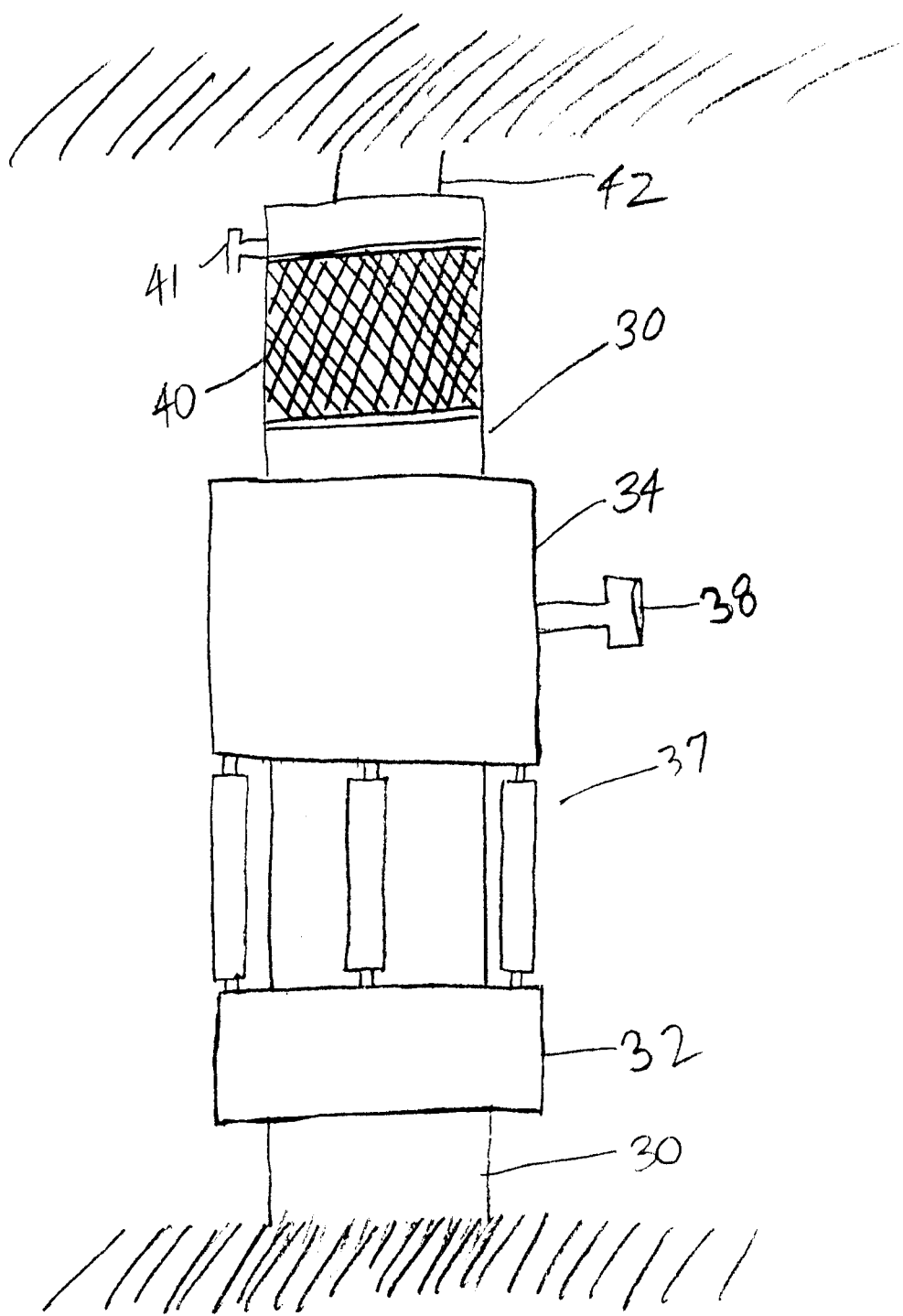
FIG. 3 is a partial elevational view of an alternate embodiment of the invention.

Upper spring support member 34 and lower spring support member 32 are attached to pod leg 30 for absorbing vertical shock of movement by the operator 200 (FIG. 6). A series of springs 36 are supported by the upper and lower members. As in FIG. 2, the springs 36A–C may be coil springs. The spring series could be other types such as elastic spring columns 37, as shown in FIG. 3. Also, in lieu of a spring series, an elastic sock may be used to absorb vertical motion. In a preferred embodiment, the spring series consist of four columns of springs, however the number and type of springs employed may vary as long as the function is met, while not departing from the scope of the invention.

One or both of the spring support members may be slidably attached to said pod leg 30. As shown in FIG. 2, the lower member 32 is permanently affixed to the pod leg 30 while the upper member 34 is slidably attached thereto. In this instance, the upper member 34 may have a set screw 38, which keeps the upper member 34 stationary when torque is applied thereto.

Figure 4:
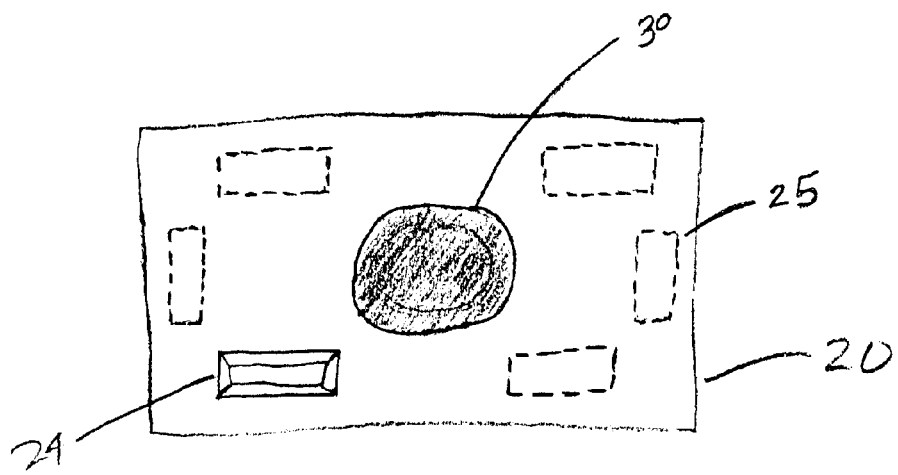
FIG. 4 is a plan view of the counter balance assembly in accordance with the present invention.
Figure 5:
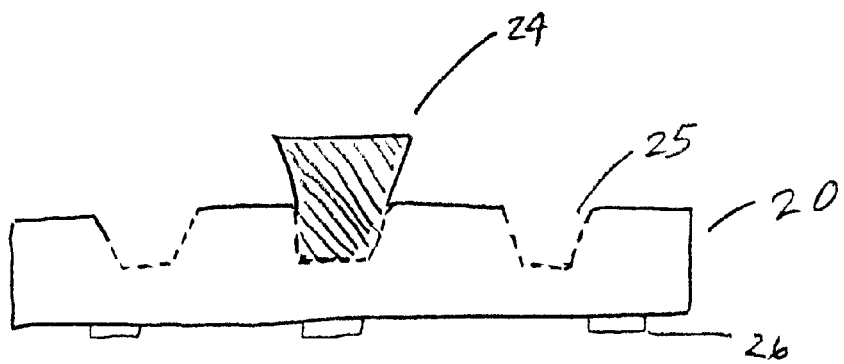
FIG. 5 is a side view of the counter balance assembly of FIG. 4.
Figure 5A:
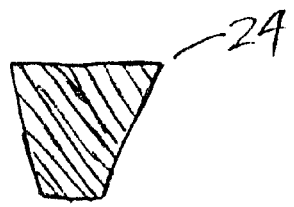
FIG. 5A shows a weight in accordance with the present invention.

Located at the bottom of the pod leg 30 is the counter weight assembly. As best illustrated in FIGS. 4–5A, the assembly has a base 20 formed of a suitable rigid material such as metals, alloys, wood or the like. The base 20 may be rigidly affixed to pod leg 30 or it may be removably attached via a hindge or wing nut or any suitable means; however the means of attachment may vary as long as the function is met without departing from the scope of the invention. The base 20 has slots 25 formed therein to receive removable weights 24. The weights are used to offset the weight of the optical equipment at the uppermost part of the monopod 10. This includes the camera 100 as well as any incidentals such as cords or peripheral equipment. The weights 24 may be formed in a trapezoidal shape as shown in FIG. 5A. Such as shape is advantageous in that is has a higher mass per volume.

Base 20 is shown in a rectangular shape, however the base may take on other shapes, Likewise other shapes outside of a trapezoid may be used to form the weights 24. The base 20 has friction-enhancing contacts 26 to aid in maintaining placement on a surface. These contacts may be elastomeric, rubberized, or any suitable friction enducing material, discs affixed to the base 20.

FIG. 6 illustrates an operator 200 employing the use of monopod camera mount 10. One hand is used to grip the pod leg 30 at the grip section 40. When the monopod 10 is in use on uneven terrain, such as steps, illustrated herein, the camera 100 may experience minimal jostling as the counterweight assembly and spring assembly facilitate steady image recording during movement along steps 80.

Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application. The specification is not intended to be limiting as to the scope of the invention in any way.

Accordingly, the scope of the float cam should be determined not by the embodiments described and illustrated, but by the appended claims and their legal equivalents.

I claim:

1. A hand held, counter balancing monopod comprising:
   mounting means for mounting optical equipment, said mounting means having a proximal end
      wherein said mounting means has connecting means at said proximal end for connecting said mounting means to said optical equipment;
   swivel means coupled to the distal end of said mounting means for providing rotational motion of said mounting means,
      said swivel means having an upper end and a lower end, and said lower end having a swivel peg at the lower end, said swivel peg having a protruding male mating means for mating, rotational engagement with a support leg;
   coupling means for coupling said swivel means to said mounting means;
   a support leg, having an upper end and a bottom end,
      said support leg having a female mating recess formed at the upper end for rotational engagement with said protruding male mating means of said swivel peg of said swivel means;
   spring means circumferentially surrounding said support leg for absorbing shock during movement; and counter balancing means affixed to the bottom end of said support leg and located in a longitudinal plane substantially perpendicular to said support leg for offsetting weight of said optical equipment thereby providing a floating motion of said monopod.

2. The hand held, counter balancing monopod, as in claim 1, wherein
   said support leg has telescoping sections adapted to extend or contract the support leg length, thereby varying height of said monopod.

3. The hand held, counter balancing monopod as in claim 2, wherein
   said swivel means further comprises a swivel peg at the lower end.

4. The hand held, counter balancing monopod, as in claim 1, wherein
   said mounting means has handle means extending substantially perpendicularly therefrom for actuating rotational motion; and
   said handle means having a remote control console attached thereto,
   said console adapted to be electrically connected to said optical equipment.

5. The hand held, counter balancing monopod, as in claim 4, wherein
   said female mating recess has keyhole means for mating engagement with said male mating means; and said
   support leg has a set screw means attached thereto for releasably stabilizing said rotational engagement.

6. The hand held, counter balancing monopod, as in claim 4 wherein
   said spring means comprises an upper spring support member and a lower spring support member, and
   a series of spring columns coupled to said upper and lower support members.

7. The hand held, counter balancing monopod, as in claim 6, wherein
   said spring columns consist of coil springs.

8. The hand held, counter balancing monopod, as in claim 6, wherein
   said spring columns consist of elastic springs.

9. The hand held, counter balancing monopod, as in claim 6, wherein
   one of said spring support members is permanently attached to said support leg and one of said support members is slidably attached to said support leg.

10. The hand held, counter balancing monopod, as in claim 9, wherein
    said slidably attached spring support member has a screw means for adjusting placement of said member along said support leg.

11. The hand held, counter balancing monopod, as in claim 6, wherein
    said counter balancing means comprises a base stand for placement on a surface during optical imaging; and
    said stand having a plurality of slots formed therein; and
    weights adapted for removable placement within said slots.

12. A monopod camera mount comprising:
    a lower support leg,
    an uppermost mounting leg, and
    an intermediary swivel leg rotably coupling said support leg to said mounting leg,
    fastener means for operatively connecting said intermediary swivel leg to said uppermost mounting leg,
    a spring support assembly affixed to said support leg, and
    a counter balance formed at a distal end of said support leg, said counter balance affixed to a bottom end of said lower support leg and located in a longitudinal plane perpendicular to said support leg.

13. The monopod camera mount, as recited in claim 12, further comprising
    a panning handle for angular and rotational movement of said mounting leg, said panning handle affixed to said mounting leg and extending substantially perpendicularly therefrom.

14. The monopod camera mount, as recited in claim 13, wherein said support leg has a recess formed therein, said recess matingly receiving the swivel leg to thereby provide panning longitudinal motion; and said support leg further having set screw means attached thereto for releasably stabilizing rotational movement of said mounting leg.

15. The monopod camera mount, as recited in claim 12, wherein said support leg has connected thereto an upper spring support and a lower spring support with a series of springs connecting both said upper and lower spring supports to one another, both said upper and lower spring supports configured and adapted to circumferentially surround said lower support leg.

16. The monopod camera mount, as recited in claim 15, wherein said counter balance consists of a rigid base for placement on a surface, and said base having slots formed therein for receiving counterbalancing weights.

17. The monopod camera mount, as recited in claim 16, wherein said fastener means comprises an adjustable bolt assembly, said bolt assembly providing angular motion of said mounting leg.

18. The monopod camera mount, as recited in claim 16, wherein said counter balance further comprises weights adapted to be removably placed within said slots, and said weights having a trapezoidal geometric form.

19. The monopod camera mount, as recited in claim 15, wherein one of said support members is permanently attached to said support leg and one of said members is slidably attached to said support leg, and wherein said slidably attached member has a set screw coupled thereto.

20. The monopod camera mount, as recited in claim 12, wherein said support leg has telescoping junctions wherein said support leg may vary in length extension, thereby varying height of the monopod.

* * * * *